Patented Apr. 7, 1936

2,036,617

UNITED STATES PATENT OFFICE 2,036,617

CLAYS AND PROCESSES FOR PREPARING SAME

Paul Bechtner and Winfred B. Hirschmann, Chicago, Ill., assignors, by direct and mesne assignments, to American Colloid Sales Division, Inc., Chicago, Ill., a corporation of Illinois No Drawing. Application September 7, 1934, Serial No. 743,155

13 Claims. (Cl. 252—1)

This invention relates to mixing clay with water, applying more particularly to clays that are difficult to slake or mix or disperse in water.

One of the objects of the invention is to provide clays in such form that they can be mixed or dispersed in water by simple and rapid methods, without the aid of electrolytes and with little mechanical effort.

Another object of the invention is to provide clays in such form that they can quickly be made into a smooth homogeneous paste without lumps or clots.

Another object of the invention is to provide clays in such form that they can readily be mixed with water in heavy concentrations with less mechanical effort than has hitherto been possible.

Another object of the invention is to provide a process for preparing soft muds, pastes, gels, or slips comprising clay and water, in which special easily slakable particle sizes of the clay are employed as the starting material.

Clays, including bentonites, are ordinarily mined in the form of large lumps containing considerable moisture, and are commonly dried and reduced to pieces of convenient size at the producing point. In such reduced form they can be more easily transported and handled and are preferred by users in the various arts. Such clays are extensively used in industrial processes where the preferred method of the user is to employ them in the form of a soft-mud, paste, gel or slip, as in ceramic processes, in the mud-laden-fluid process of drilling oil and gas wells, in the paper industry, in some phases of foundry work, in making emulsions of asphalt or other water immiscibles, in horiticultural sprays, in the manufacture of soaps and polishes and in laundry work.

A usual method of mixing clay with water is by means of wet-pans, pug mills, blungers and other stirring and agitating apparatus. With many clays this is accomplished without mechanical difficulty. When such clays are placed in the mixing vessel with water, they absorb water rapidly and are softened to a mushy mass by the kneading or stirring action of the mechanisms, and can be converted into thin pastes or slips by additional water and stirring.

Clays of a very sticky and gummy nature and those that require relatively large proportions of water to make them plastic, particularly those that swell, are more difficult to mix. Many types of bentonite are examples of these types of clays. They form tough masses that resist water penetration and complete softening, and that adhere to the mullers, paddles, stirring rods and other parts of the mechanism so as to require long continued movement and often a very considerable power consumption to incorporate them evenly with water.

There are known methods by which such difficultly mixable clays (for example bentonite) may be more easily incorporated with water, but such methods have objectionable features; for instance one method is to add electrolytes, but this has the disadvantage of altering the chemical properties of the clay, to the detriment of its employment for some purposes. Another method is to pre-heat the clay to temperatures at which some of its chemically combined water is driven off, but then some of its useful properties are inhibited in proportion to the degree of heat which has been applied. Another method is to make a paste of the pulverized clay with alcohol, acetone or other fluids, and then add the water, but this is expensive. Another method is to mix with the dry clay some inert, non-absorbent material, as whiting, powdered silica, etc., which helps to keep the particles from agglomerating and permits the water to enter them more readily. This however, changes the character of the product.

We have discovered that clays, and in particular bentonite clays, may be slaked and mixed and dispersed in water with less effort and in less time if the particles in dry form are approximately uniform in diameter and approximately of a certain preferred size or limited range of sizes, these preferred particle sizes varying with different clays and being determined by simple experiments.

Prior to our discoveries, it has been generally assumed that the finer the particle size the more readily slakable the clay and while this is true in many instances, we have discovered that in some cases coarser particle sizes are just as readily slakable as fine particle sizes, and in some instances that coarser particle sizes are more readily slakable than finer particle sizes.

The application of our invention to industry will make it unnecessary to grind some clays finer than certain meshes to secure maximum slaking ability and will provide greater ease of slaking with other clays.

Our invention includes determining the preferred particle size for any certain clay and producing the clay so that the initial product will contain a large proportion of the preferred particle sizes; then, by mechanical methods such as by screening or by air separation or by a combination of both, to separate the particles of different sizes, removing those which are finer and coarser than the desired range. The final product will lie between certain predetermined sieve meshes. We do not restrict ourselves to any particular sieve mesh size as the preferred ones will vary with different clays and it will also be practical to employ both narrow and wide ranges of particle sizes depending on varying conditions of use. For example with a certain bentonite clay, ordinarily difficult to mix, we have found that sizing between minus 40 and plus 50 mesh makes the quickest mixture while sizing between 20 and 60 mesh is somewhat less easy to mix but nevertheless a great improvement over the ordinary commercial state of preparation which consists of either finer or coarser particles or a mixture of both.

The preferred particle size is that which will require first the least expense for grinding and sizing before adding to water, second, the least time to disintegrate in water, and third, the least time and power for completion of a homogeneous paste or slip. As to the first it is obvious that if larger lumps will disintegrate as rapidly as finer particles the larger lumps will be the preferred size since finer grinding is more expensive; therefore, if the tests described below indicate no difference in rate of disintegration and ease of mechanical mixing between two sizes, the larger size will be generally the preferred one. With easily slakable clays this is often the case but our improved method is more particularly applicable to difficulty-slakable clays.

We prefer to use the following tests for determining the minimum time for disintegration or slaking in water: 300 grams or more of the clay, for example, bentonite, are dried in an oven at 105° C. for an hour or until enough of the mechanically held moisture is driven off so that the material can be easily crushed. It is ground and separated in a stack of sieves to fractions or portions of restricted particle sizes such as minus 2 plus 4 mesh, minus 10 plus 20 mesh, and so on down to minus 100 mesh and finer if necessary. 150 cc. of water at 25° C. are put into a 250 cc. beaker. One of the fractions of clay is weighed and from this fraction, clay is taken and added to the water within the beaker at the rate of a teaspoonful (or other substantially constant or exactly constant small amount) every five seconds until the beaker is filled about three-quarters of the way to the surface of the water. The remainder of the fraction is weighed and the quantity which has been added to the water is calculated by difference, and this quantity is termed the "test quantity". The mixture in the beaker, immediately after completion of the additions of the clay, is then stirred for a selected short interval of time, for example, twenty seconds, with an ordinary electric drink mixer or laboratory stirrer. If any lumps or cohered particles remain, it is evident that the clay will not disintegrate or slake promptly when added to the water at the above rate and the experiment is repeated using a longer time between the additions of each spoonful or other chosen amount of clay, until the minimum time is determined at which such "test quantity" can be added to the water to yield a smooth paste or slip with the selected amount of stirring. If the "test quantity" added to the water at the rate of a teaspoonful every five seconds, followed by the twenty seconds agitation, as described above, yields a mixture which is free from any lumps or cohered particles, then, in that event, a more rapid rate of addition, that is to say, a shorter time interval between each addition of a teaspoonful of clay, should be employed in tests, until the formation of lumps or cohered particles is occasioned, whereupon subsequent tests are made using a longer time between the additions of each teaspoonful of clay, until the minimum time is determined at which the "test quantity" can be added to the water to yield a smooth paste or slip with the selected amount of stirring.

The test is then repeated with "test quantities" taken from each of the other separated clay fractions or sizes and the results tabulated and compared. If the clay is of the difficulty-slakable type it will be found that the rate of disintegration or slaking will be more rapid with some of the restricted sized fractions and that will be the preferred size to use. In the case of some shaly clays and those which occur in very hard dry form in their natural state, for example, an Illinois fire clay, the rate of slaking increases uniformly down to the finest grinding and such clays simply require to be exceedingly finely ground without sizing. There are other types of clays, however, in which the rate of slaking increases with progressive finer crushing down to certain particle sizes but again becomes slower when finer sizes are used.

It is to be understood that in the tests described above, the amount of water that can be used is not limited to 150 cc. This latter amount of water is stated by way of example, and the tests can be performed using a larger or smaller amount of water in a receptacle of suitable size. The "test quantity" of clay may also be added in the small portions at fixed intervals of time which may be different from the five seconds interval described above; however, it has been found that the five seconds interval described is a practical interval in performing the tests. In addition, in performing the tests the "test quantity" of clay may be added to the water as a constant stream, or a more or less constant one, for each test, and the minimum time at which the "test quantity" can be added to the water to yield a smooth paste or slip, with the selected amount of stirring, determined by increasing or decreasing (as the case may be) the amount of clay which enters the water per unit of time.

*Example 1.*—A Kentucky ball clay was dried at 105° C. for an hour and ground and separated by sieves to different fractions consisting of:

Minus 1 plus 2 mesh
Minus 2 plus 4 mesh
Minus 4 plus 6 mesh
Minus 6 plus 10 mesh
Minus 10 plus 20 mesh
Minus 20 plus 30 mesh
Minus 30 plus 40 mesh The various samples of equal weight were added to the water as described above and the following results obtained:

Table 1

| Particle size | Time required to form a smooth dispersion |
|---|---|
| Minus 1 plus 2 mesh | |
| Minus 2 plus 4 mesh | 28 minutes. |
| Minus 4 plus 6 mesh | 11 minutes. |
| Minus 6 plus 10 mesh | 6½ minutes. |
| Minus 10 plus 20 mesh | 1½ minutes. |
| Minus 20 plus 30 mesh | 30 seconds. |
| Minus 30 plus 40 mesh | 30 seconds. |

It will be seen that particles of 20 mesh and smaller sizes disintegrate about as fast as can be added to the water and therefore 20 mesh is as fine as this clay needs to be ground. A further test was then made using 20 mesh and finer without separation of the finer particles which indicated that the rate of dispersion was not hindered by their presence; therefore, in this case the clay need not be air-separated so as to fall between any particular meshes provided only that it is ground so that there will be few if any particles larger than 20 mesh.

*Example 2.*—An indurated fireclay was dried, ground, and sieved in the same way. The larger particles slaked off into flaky pieces which were difficult to disperse smoothly even after long soaking. Even the minus 100 mesh required considerable time to become soft. With this clay the preferred particle size is finer than 200 mesh.

*Example 3.*—A bentonite clay from Weston County, Wyoming was dried, sieved, and tested in the same way with the following results:

Table 2

| Particle size | Time required to form a smooth dispersion |
|---|---|
| Minus 4 plus 10 mesh | 1 hour 25 minutes. |
| Minus 10 plus 20 mesh | 0 hours 14 minutes. |
| Minus 20 plus 30 mesh | 0 hours 5 minutes. |
| Minus 30 plus 40 mesh | 0 hours 3 minutes. |
| Minus 40 plus 50 mesh | 0 hours 1¼ minutes. |
| Minus 50 plus 60 mesh | 0 hours 1½ minutes. |
| Minus 60 plus 80 mesh | 0 hours 2 minutes. |
| Minus 80 plus 100 mesh | 0 hours 6¾ minutes. |
| Minus 200 | 1 hour 20 minutes. |

The bentonite clay used in Example 3 is customarily produced and sold in commercial form as a powder, 90 to 95% minus 200 mesh, and in dry crushed and granulated form. Typical dry sieve analysis of these customary commercial grades are as follows:

| | Commercial 200-mesh powdered bentonite | Commercial dried and granulated bentonite |
|---|---|---|
| | *Percent* | *Percent* |
| Plus 4 mesh | 0.0 | 2.0 |
| Minus 4 mesh Plus 10 mesh | 0.0 | 25.0 |
| Minus 10 mesh Plus 16 mesh | 0.0 | 45.0 |
| Minus 16 mesh Plus 30 mesh | 0.0 | 18.0 |
| Minus 30 mesh Plus 50 mesh | 0.0 | 6.0 |
| Minus 50 mesh Plus 100 mesh | 0.1 | 2.0 |
| Minus 100 mesh Plus 150 mesh | 0.4 | 1.0 |
| Minus 150 mesh Plus 200 mesh | 4.4 | 1.0 |
| Minus 200 mesh Plus 270 mesh | 12.3 | |
| Minus 270 mesh | 82.8 | |
| | 100.0 | 100.0 |

This clay is particularly difficult to mix and a further test was made using the above two commercial grades for comparison with selectively sized grades, and using larger quantities than in the initial experiment in order to determine the preferred particle size within close limits under varying conditions.

One pound of the various fractions was added to one gallon of water at the optimum rate to produce a perfectly smooth paste with only 20 seconds of subsequent stirring. Three series of tests were made to compare the effect of water temperature. The vertical columns show the effect of sizing on the speed of disintegration of this clay. The horizontal columns show the effect of water temperature.

*Minimum time required to completely slake and soften 1 lb. of Wyoming bentonite clay*

| Temp. of water | 20° C. | 60° C. | 93° C. |
|---|---|---|---|
| *Particle size of sample* | | | |
| Commercial 4 mesh grade | 50 min. | 30 min. | 10 min. |
| Minus 10 plus 20 mesh | 8 min. 30 sec. | 4 min. | 1 min. 20 sec. |
| Minus 20 plus 30 mesh | 4 min. | 1 min. 45 sec. | 0 min. 50 sec. |
| Minus 30 plus 40 mesh | 2 min. 45 sec. | 0 min. 50 sec. | 0 min. 35 sec. |
| Minus 40 plus 50 mesh | 1 min. 30 sec. | 1 min. 30 sec. | 1 min. 30 sec. |
| Minus 50 plus 60 mesh | 5 min. | 2 min. 30 sec. | 1 min. 30 sec. |
| Minus 60 plus 80 mesh | 27 min. | 14 min. | 8 min. |
| Commercial 200 mesh grade | 11 hrs 30 min. | 8 hrs. | 5 hrs. |

Subsequent mechanical stirring for 20 seconds reduced these to perfectly homogeneous pastes.

When the above bentonite clay is selectively sized, as into particles of minus 20 mesh and plus 40 mesh or minus 20 mesh and plus 50 mesh, or minus 30 mesh and plus 60 mesh, or minus 10 mesh and plus 80 mesh or sizes lying between 4 mesh and 100 mesh, a great economy of time and effort is achieved in many commercial processes. Similar improvement can be attained with other difficultly slakable clays by selectively sizing to the preferred size in each instance.

While we do not limit ourselves to any particular method of adding the clay to the water, we prefer to carry the selectively sized clay in a bin over a tank. The bottom of this bin may be a steel sheet perforated with small holes and having a closure gate. Using, for instance, a tank of 4 feet diameter, we prefer to confine the perforated area of the steel plate to 3 feet diameter. By having holes $\frac{3}{16}$ inch in diameter with one hole to each square inch of surface of the three feet circle in the plate, the minus 20 plus 40 selectively sized bentonite clay, for instance, will flow into the tank at a rate of 1,000 pounds in five minutes. By thus spreading it over the surface of the water a very complete slaking is accomplished with little labor and time. The gate closure can be arranged so that part of the holes can be closed and by such manipulation and by using hot or cold water the rate of slaking and the concentration of the final mixture can be readily adjusted to the requirements, by anyone skilled in the art of manipulating clay.

For comparison with the above rapid and economical method a large quantity of the regular commercial 200 mesh powdered bentonite and of the dried and granulated grade of bentonite were made into pastes by means of ordinary mixing machinery, using a tank type mixer having a heavy agitator with alternating blades revolving in opposite directions. The water was put into the tank first and the clay added at the best rate to permit the machinery to operate smoothly, under the direction of a man experienced in clay mixing. The results indicated a requirement of 5 horsepower and 2 hours of mixing to produce 500 gallons of paste containing 17% of this clay. Compared with this a paste of similar quantity and concentration can be made with our selectively sized grains of the same clay by allowing it to drop into the water as above described, taking five minutes time and not over ten minutes subsequent stirring to smooth out the softened particles.

Our improvement is not limited to any particular clays as selective sizing will improve the slaking of any clay. Nor is it limited to the particular method of testing to determine the best slaking sizes. Nor is it limited to the concentration or percentage of clay in water as a selectively sized clay will improve the formation of both thick and thin dispersions. Neither is it limited to any particular size of particle as that will depend on the physical and chemical characteristics of the kind of clay or bentonite used.

We are aware that electrolytes may be used to increase speed of slaking of clays, for instance, by adding them in the form of a dry powder to dry clay or by using water containing electrolytes but the use of such electrolytes detrimentally affects the properties of the clay for use in some processes, whereas our product may consist wholly of natural clay without chemical additions or changes. However, it is to be understood that electrolytes may be added to the specially sized products prepared in accordance with the present invention, as well as other ingredients used in the preparation of dispersions, emulsions, muds, pastes, gels or slips, and the claims should be read as covering the products, their use and preparation, with and without such additions.

In the foregoing description the terms "minus" and "plus" are used in connection with sieve sizes or meshes and materials sized by means of sieves; and by the term "minus" we mean to indicate that material passes through the designated sieve, and by the term "plus" we mean to indicate that material is retained on the designated sieve. Thus, for example, "minus 10 mesh" indicates that the material passes through a 10 mesh sieve; "plus 20 mesh" indicates that the material is held on a 20 mesh sieve; and "minus 10-plus 20 mesh" indicates that the material passes through a 10 mesh sieve but is held on a 20 mesh sieve.

From the foregoing it will appear that a certain size or sizes of clays will more readily slake to form a dispersion, emulsion, paste, mud slurry, gel or slip in water than will other larger or smaller sizes, and herein such certain size and sizes are defined as the "critical slaking size" or the "critical slaking sizes", and the range of sizes over which a dispersion, emulsion, paste, mud slurry, gel or slip in water are formed more readily and quickly than if larger or smaller sizes are used is defined herein as the "critical slaking size-range". Examples of clays of this type are found in the bentonite clays.

It will also appear from the foregoing that in the case of certain clays, grinding to sizes finer than a certain mesh does not substantially hasten or retard, facilitate or hinder, the formation of a dispersion, emulsion, paste, mud, gel or slip in water and this size is defined herein as the "natural dispersion size". An example of this type of clay is the Kentucky ball clay referred to in Example 1 above.

While we have described a particular method of testing the clays to determine the best or most rapid slaking sizes, it will be understood that other methods of testing may readily occur to persons skilled in the art and that our invention is not limited to the particular method of testing described, but includes broadly the determination of the critical or best slaking size and the production of the clays so that the particles thereof are largely within the critical or best slaking size range.

We claim:

1. The process of facilitating the slaking of difficultly slakable clay which comprises determining the critical slaking size range of such clay, disintegrating such clay in the dried condition and separating particles of such clay from the disintegrated mass including in large part a size lying within the critical slaking size-range.

2. The process which comprises determining the critical slaking size range of bentonite, disintegrating dried bentonite and separating particles of bentonite from the disintegrated mass including in large part a size lying within the critical slaking size-range.

3. The process of preparing dispersions, emulsions, muds, pastes, gels or slips which comprises gradually adding to water particles of gel or sol forming clay having a size lying within the critical slaking size-range.

4. The process of preparing clay for use in forming suspensions consisting in determining the critical slaking size range of the clay and sizing the clay so that the particles are largely within the said size range.

5. The process of preparing gel or sol forming clay for use in forming suspensions which consists in sizing the clay between an upper and a lower limit to place the particles largely within the critical slaking size range.

6. The method of producing clay in the critical slaking size range which comprises determining the critical slaking size range of clay by adding measured amounts of differently sized clay to water at spaced intervals of time such that on subsequent stirring for a standard time a homogeneous paste is produced, determining the minimum time in which a homogeneous paste can be produced from each size range and producing the clay in the size range which produces a homogeneous paste in the minimum time under the test conditions.

7. A mass of particles of gel-forming clay, said particles being selectively sized so that a gel or sol will be formed that is substantially free from sticky agglomerates or unsaturated lumps when the particles are dropped into water without stirring, at a rate at least twice as fast as required to form a similar gel or sol when using unselectively sized particles of the same clay.

8. A mass of particles of bentonite clay, said particles being selectively sized so that they will slake spontaneously to be substantially free from sticky agglomerates or unsaturated lumps when the particles are dropped into water without stirring, at a rate at least twice as fast as required for unselectively sized particles of the same clay to slake similarly.

9. The process of preparing bentonite clay for use in forming suspensions which consists in sizing the clay particles so that they pass through a 20 mesh sieve and are retained on an 80 mesh sieve, with not more than a small proportion of finer or coarser particles.

10. The process of preparing bentonite clay for use in forming suspensions which consists in sizing the clay particles so that they pass through a 12 mesh sieve and are retained on a 100 mesh sieve, with not more than a small amount of finer or coarser particles.

11. The process of preparing bentonite clay for use in forming suspensions which consists in preparing the clay particles so that they pass through a 30 mesh sieve and are retained on a 60 mesh sieve, with not more than a small quantity of finer or coarser particles.

12. A gel-forming clay for use in forming suspensions in which the particles are sized largely according to its critical slaking size range.

13. The process of preparing bentonite clay for use in forming suspensions which consists in preparing the clay particles so that they pass through a 30 mesh sieve and are retained on a 40 mesh sieve, with not more than a small quantity of finer or coarser particles.

PAUL BECHTNER.
WINFRED B. HIRSCHMANN.